United States Patent
Wu et al.

(10) Patent No.: US 7,191,953 B2
(45) Date of Patent: Mar. 20, 2007

(54) RADIO FREQUENCY IDENTIFICATION DEVICE IMPLEMENTED WITH A METAL-GATE SEMICONDUCTOR FABRICATION PROCESS

(75) Inventors: Che Ming Wu, Hsinchu (TW); Ying Feng Wu, Hsinchu (TW); Wen Feng Lee, Hsinchu (TW)

(73) Assignee: G-Time Electronic Co., Ltd., Hsinchu (TW)

( * ) Notice: Subject to any disclaimer, the term of this patent is extended or adjusted under 35 U.S.C. 154(b) by 128 days.

(21) Appl. No.: 11/140,901

(22) Filed: Jun. 1, 2005

(65) Prior Publication Data

US 2005/0263603 A1 Dec. 1, 2005

(30) Foreign Application Priority Data

Jun. 1, 2004 (TW) .............................. 93208619 U (51) Int. Cl.
*G06K 19/06* (2006.01)
(52) U.S. Cl. ...................... 235/492; 235/451; 235/476; 340/825
(58) Field of Classification Search ................ 235/436, 235/476, 451; 340/825
See application file for complete search history.

(56) References Cited

U.S. PATENT DOCUMENTS

| 6,223,990 B1 * | 5/2001 | Kamei ........................ 235/492 |
| 7,014,112 B2 * | 3/2006 | deVos et al. ................ 235/451 |
| 2004/0256468 A1 * | 12/2004 | Akiho et al. ................ 235/492 |

OTHER PUBLICATIONS

Usami ("An ultra small RFID chip: μ-chip", Radio Frequency Integrated Circuits (RFIC) Symposium, 2004. Digest of Papers. 2004, Jun. 6-8, 2004 pp. 241-244).*

* cited by examiner

*Primary Examiner*—Seung Ho Lee
(74) *Attorney, Agent, or Firm*—Rosenberg, Klein & Lee (57) ABSTRACT

The present invention discloses a radio frequency identification device implemented with a metal-gate semiconductor fabrication process, wherein the charge capacitor, which is formed by the special parasitic N-type and P-type guard rings in the chip fabricated with the metal-gate process, incorporated with the original P-type and N-type transistors of metal oxide semiconductor (PMOS/NMOS) not only can provide a horizontal surface current but also can provide a rectified current for the performance of the entire circuit, which can advance the metal gate process to RFID industry in cooperation with an identification code holder circuit and a non-synchronous local oscillation circuit so that the fabrication cost can be lowered and the fabrication time can be shortened.

5 Claims, 13 Drawing Sheets

T : The Highest Possitive Voltage Source
⏚ : Ground
▨ : Metal Gate
⊠ : Contact
P+G : P-type Doped Guard Ring
N+G : N-type Doped Guard Ring
P+ : P Type Diffusion
N+ : N Type Diffusion
PWELL : P Type Well
N-Sub : N Type Substrate

RADIO FREQUENCY IDENTIFICATION DEVICE IMPLEMENTED WITH A METAL-GATE SEMICONDUCTOR FABRICATION PROCESS

BACKGROUND OF THE INVENTION

1. Field of the Invention

The present invention relates to a circuit of radio frequency identification (RFID) tag device, particularly to a radio frequency identification (RFID) device implemented with a metal-gate semiconductor fabrication process, which has the advantages of lower fabrication cost, shorter fabrication time, more stable performance, and no extrinsic element needed.

2. Description of the Related Art

Among the Standard CMOS Poly-silicon Logic Processes, the simplest one—the Single-Poly Single-Metal (SPSM) process—still needs to use nine cycles of photomask procedures. Those conventional technologies have advanced to a deep sub-micrometric process or even a nanometric process, and the operational clock of the chip can be promoted thereby. However, the fabrication cost and time thereof is also increased.

Figure 1:
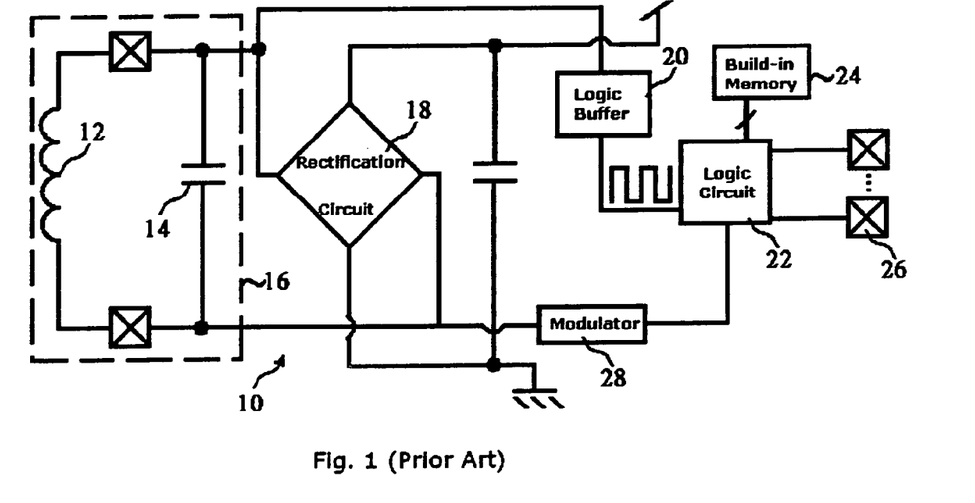
FIG. 1 is a schematic block diagram of the circuit of a conventional RFID tag.

At present, RFID tag technology has been widely applied in merchandise bar codes, building security, animal identification, warehousing and distribution management, consumer electronic products, and interactive toys. Refer to FIG. 1 a schematic block diagram of the circuit of a conventional RFID tag 10. A rectification circuit 18 and a resonator 16 comprising an antenna 12 and a capacitor 14 provide electric energy for the RFID tag 10 via a method of electromagnetic induction. Via a logic buffer 20, the resonance frequency of the resonator 16 can be used as the source of the synchronous clock of a RFID tag logic circuit 22. With the synchronous clock, the logic circuit 22 can control a modulator 28 according to a secured identification code stored in a built-in memory 24 or bonding pads 26 to generate a RFID signal.

However, at present, RFID tag is too expensive to be generally used in daily living because the fabrication cost and time of the poly-silicon gate semiconductor process, which the conventional RFID tag adopts, is very high and long. Further, the conventional RFID tag uses a single capacitor or a set of parallel-connected capacitors to store electric charge, which will waste the area of a chip. Furthermore, referring to FIG. 2, the fabrication of the P-type metal oxide semiconductor (PMOS) and the N-type metal oxide semiconductor (NMOS), which are adopted by the conventional RFID tag, need numerous cycles of photomask 30 procedures. Moreover, the fabrication of the conventional RFID tag adopts a sub-micrometric or a deep sub-micrometric or even a nanometric process, which demands higher precision. Therefore, the cost of RFID tag will be the biggest barrier for its competencies.

In the abovementioned problems, the present invention proposes a radio frequency identification device implemented with a metal-gate semiconductor fabrication process to effectively reduce the fabrication cost and time of the RFID device.

SUMMARY OF THE INVENTION

The primary objective of the present invention is to provide a radio frequency identification device implemented with a metal-gate semiconductor fabrication process in order to obviously reduce the fabrication cost and time of the RFID device and to enable the RFID device to be generally used in daily living.

Another objective of the present invention is to provide a radio frequency identification device implemented with a metal-gate semiconductor fabrication process, which adopts a special junction capacitor created when the metal-gate process is used to fabricate a general logic circuit or transistors to store electric charge so that no additional capacitor be needed and the chip area be reduced and the fabrication cost be lowered.

Yet another objective of the present invention is to provide a radio frequency identification device implemented with a metal-gate semiconductor fabrication process, wherein a non-synchronous oscillation circuit is installed there inside, and a special program code is installed inside a RFID reader and used to read data correctly, in order to enable the operational clock to be synchronized.

Further another objective of the present invention is to provide a radio frequency identification device implemented with a metal-gate semiconductor fabrication process, which has an over-voltage protection circuit that can be fabricated with a metal-gate process in order to prevent the chip from unstable performance, breakdown or burnout resulting from too high an operational voltage created by too high an induced energy.

To achieve the aforementioned objectives, the present invention utilizes a resonance circuit, a rectification circuit and a charge capacitor to provide power for the entire device, wherein the charge capacitor is formed by special parasitic junction capacitors created by N-type doped and P-type doped guard rings in the chip fabricated by the metal gate process. The present invention has at least one identification code holder circuit, wherein each identification code holder circuit is coupled to a bonding pad, and each bonding pad stores an identification code, and the identification code holder circuit utilizes an initial state to control the bonding pad. The present invention also has a digital logic/control circuit, which utilizes the local oscillation signal created by a non-synchronous local oscillation circuit and the identification codes inside the bonding pad to control a modulator to generate a radio frequency identification signal.

To enable the objectives, technical contents, characteristics, and accomplishments of the present invention to be more easily understood, the embodiments of the present invention are to be described below in detail in cooperation with the attached drawings.

DETAILED DESCRIPTION OF THE INVENTION

The present invention utilizes a metal-gate semiconductor fabrication process to implement a radio frequency identification device. In contrast with the conventional RFID device fabricated with an expensive poly-silicon process, the present invention is characterized in being fabricated with an economic metal-gate process. However, the operational clock of the device fabricated with the metal-gate process is slower. Nevertheless, the circuit of the present invention can enable the RFID device to operate normally with the fabrication cost and time thereof being obviously reduced.

Figure 3:
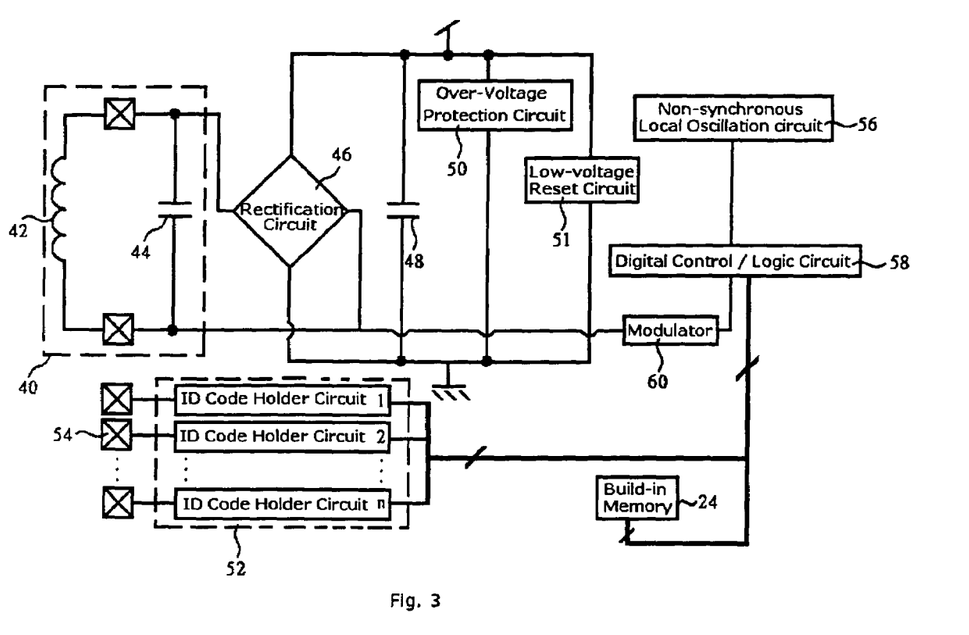
FIG. 3 is a schematic block diagram of the circuit of the RFID device according to one aspect of the present invention.

Referring to FIG. 3 a schematic block diagram of the circuit of the RFID device according to one aspect of the present invention, the RFID device of the present invention comprises a resonance circuit 40, which can stabilize frequencies and can select the radio frequencies and is formed of an external antenna 42 and an internal capacitor 44 and is coupled to a rectification circuit 46. The rectification circuit 46 is connected with a charge capacitor 48, an over-voltage protection circuit 50, and an low-voltage reset circuit 51. An external power source is coupled to and used to charge the charge capacitor 48. Cooperating with the resonance circuit 40 and the rectification circuit 46, the charge capacitor 48 provides power for the total RFID device in an electromagnetic induction method. However, in some conditions, the induced energy could be too high, which will results in too high an operational voltage of the RFID device so that the performance will be unstable or the breakdown or the burnout of the chip may occur. The present invention can utilize the over-voltage protection circuit 50 to avoid the abovementioned problems. When the induced energy is too low, the performance of the circuit could also be abnormal, and the present invention utilizes the low-voltage reset circuit 51 to avoid the unstable performance of the RFID device resulting from an under voltage.

Figure 4A:
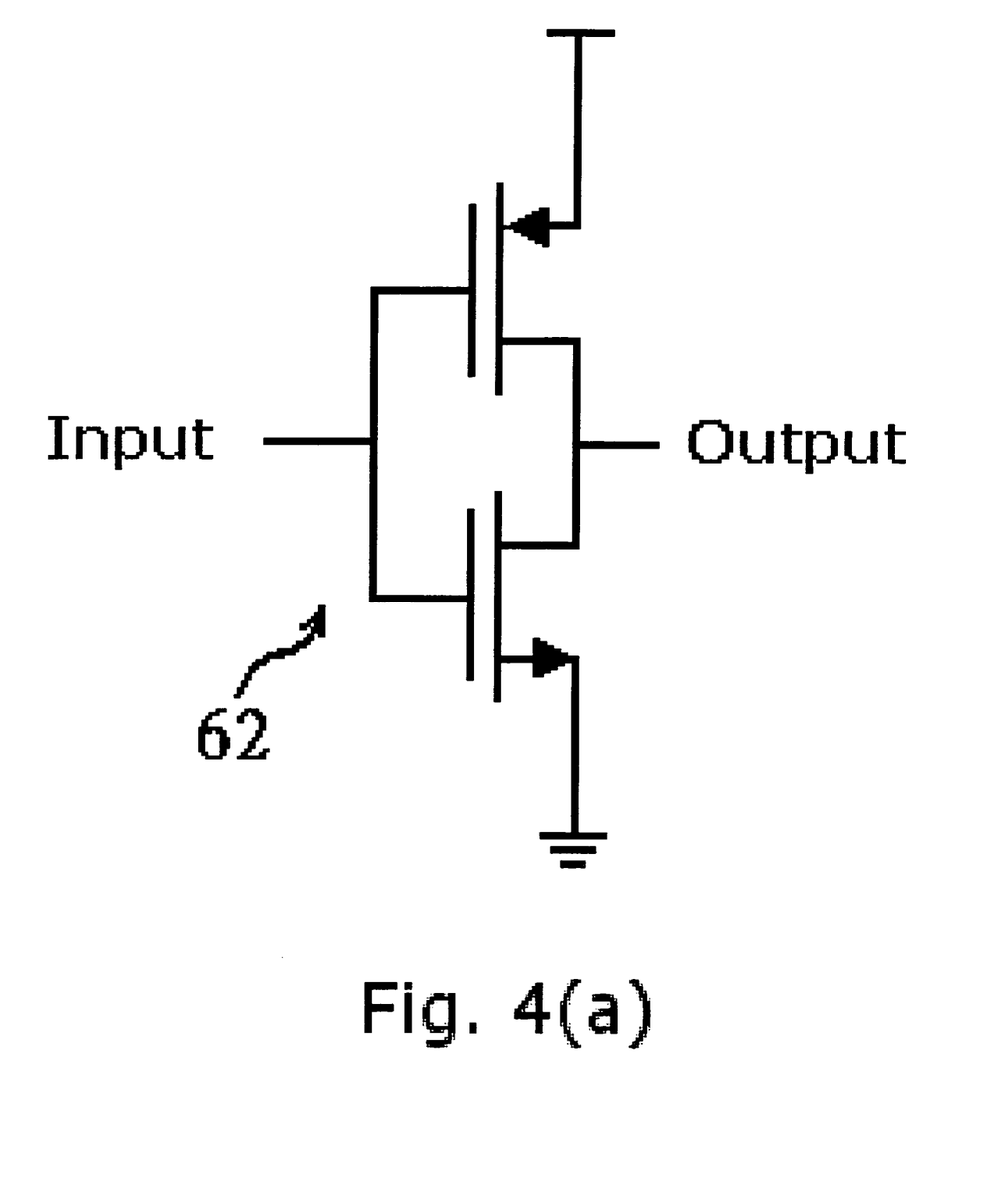
FIG. 4(a) is the circuit diagram of the logic inverter used in the present invention.
Figure 4B:
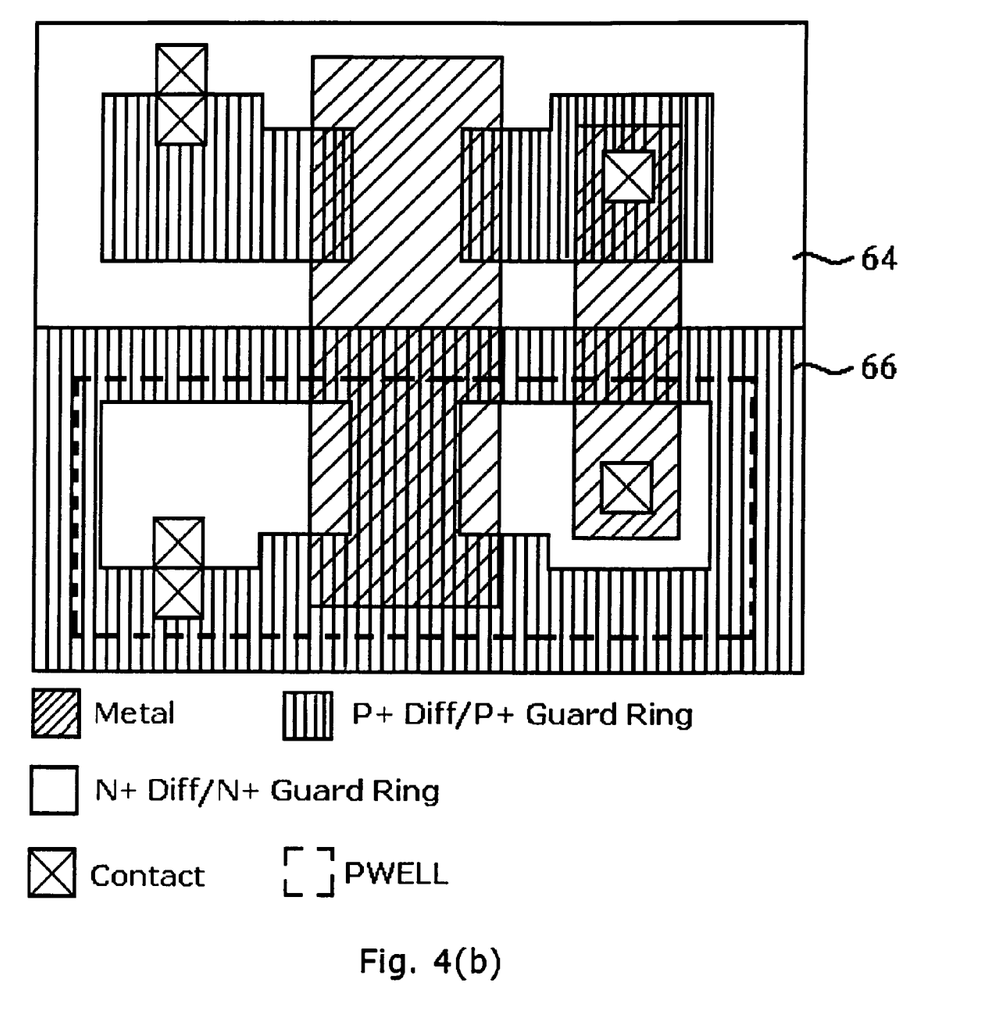
FIG. 4(b) shows schematically the layout of the circuit in FIG. 4(a) implemented with a the metal-gate process.
Figure 4C:
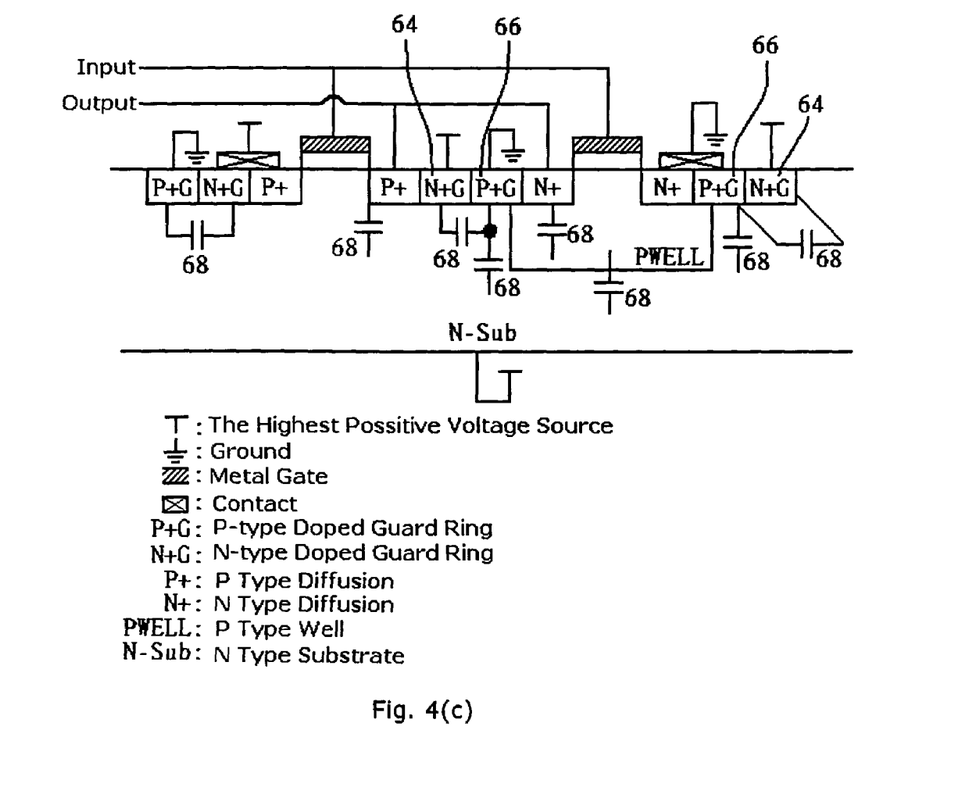
FIG. 4(c) shows schematically a sectional view of the circuit in FIG. 4(a) implemented with a metal-gate process.

The conventional RFID device has to expend some portion of space on the charge capacitor, which is in the form of an integral capacitor or dispersed capacitors. However, in the present invention, the charge capacitor is formed of the parasitic junction capacitors created by the N-type doped and P-type doped guard rings existing in each element implemented with the metal-gate process. Exemplified by a logic inverter, as shown in FIG. 4(a) the circuit diagram of a logic inverter 62 and FIG. 4(b) and FIG. 4(c) the layout and the vertical view of the logic inverter implemented with the metal-gate process, a parasitic junction capacitor 68 created by a N-type doped guard ring 64 and a P-type doped guard ring 66 can exactly function as the charge capacitor 48 shown in FIG. 3. The electric characteristics of those parasitic capacitors 68 will directly or indirectly lower the operation speed, which is the primary reason why the fabrication of the conventional RFID device does not adopt the metal-gate process. Nevertheless, the present invention contrarily takes a benefit from the parasitic characteristics of the parasitic junction capacitors 68, and directly utilizes those parasitic junction capacitors 68 as the charge capacitor 48 of the RFID device. Therefore, it is unnecessary for the present invention to expend additional layout area on the charge capacitor 48. In contrast with two-dimensional capacitor structure between two layers in the conventional technology, the parasitic junction capacitor 68 is of a three-dimensional junction structure and has a higher unitary capacitance; thus, the present invention can effectively save the area expended on the charge capacitor 48 in the conventional technology.

Refer to FIG. 3 again. In addition to that a memory 24 can be used to implement the identification code (ID code) as in the conventional technology, the present invention can also comprise at least one ID code holder circuit 52. Each ID code holder circuit 52 is coupled to a bonding pad 54, and each bonding pad 54 stores an ID code, which enables the ID code holder circuit 52 to be able to utilize the initial state of the device to control the bonding pad 54. The present invention can further comprise a non-synchronous local oscillation circuit 56, which can generate a local oscillation signal. A special program code is installed inside a RFID reader, which cooperates with the non-synchronous local oscillation circuit 56 in order to correctly read data. The non-synchronous local oscillation circuit 56 is coupled to a digital control/logic circuit 58, which enables the digital control/logic circuit 58 to utilize the local oscillation signal to control a modulator 60 according to the ID codes inside the bonding pads to generate a RFID signal that is sent out via an antenna 42.

The functions and the efficacies of the abovementioned constituent elements are to be further described below in detail.

Figure 5A:
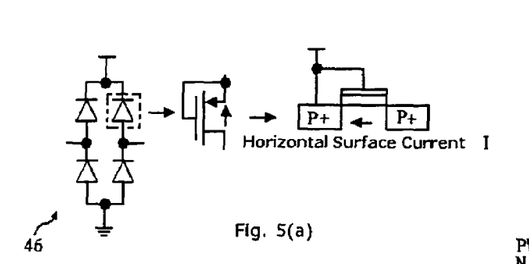
FIG. 5(a) is the diagram of the rectification circuit used in the present invention.
Figure 5B:
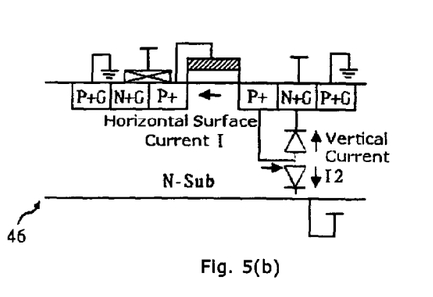
FIG. 5(b) shows schematically a sectional view of the circuit in FIG. 5(a) implemented with a metal-gate process.

With respect to the rectification circuit 46, the present invention can use a general traditional rectification circuit shown in FIG. 5(a), which adopts transistors to enhance current efficiency, wherein all the transistor elements control current via creating channels, which is similar to a two-dimensional surface current in substance. Nevertheless, the present invention can also directly apply the parasitic effect occurring in the chip fabricated with the metal-gate process to the RFID device of the present invention. There are many PN junctions in the vertical section, which not only form the capacitors in depletion zones but also form diode elements 70, and those diode elements 70 can also form a traditional rectification circuit 46 indirectly, as shown in FIG. 5(b). Thus, the present invention not only uses a circuit design skill to implement rectification but also uses the parasitic elements in the metal-gate process to enhance rectification efficiency.

Figure 6:
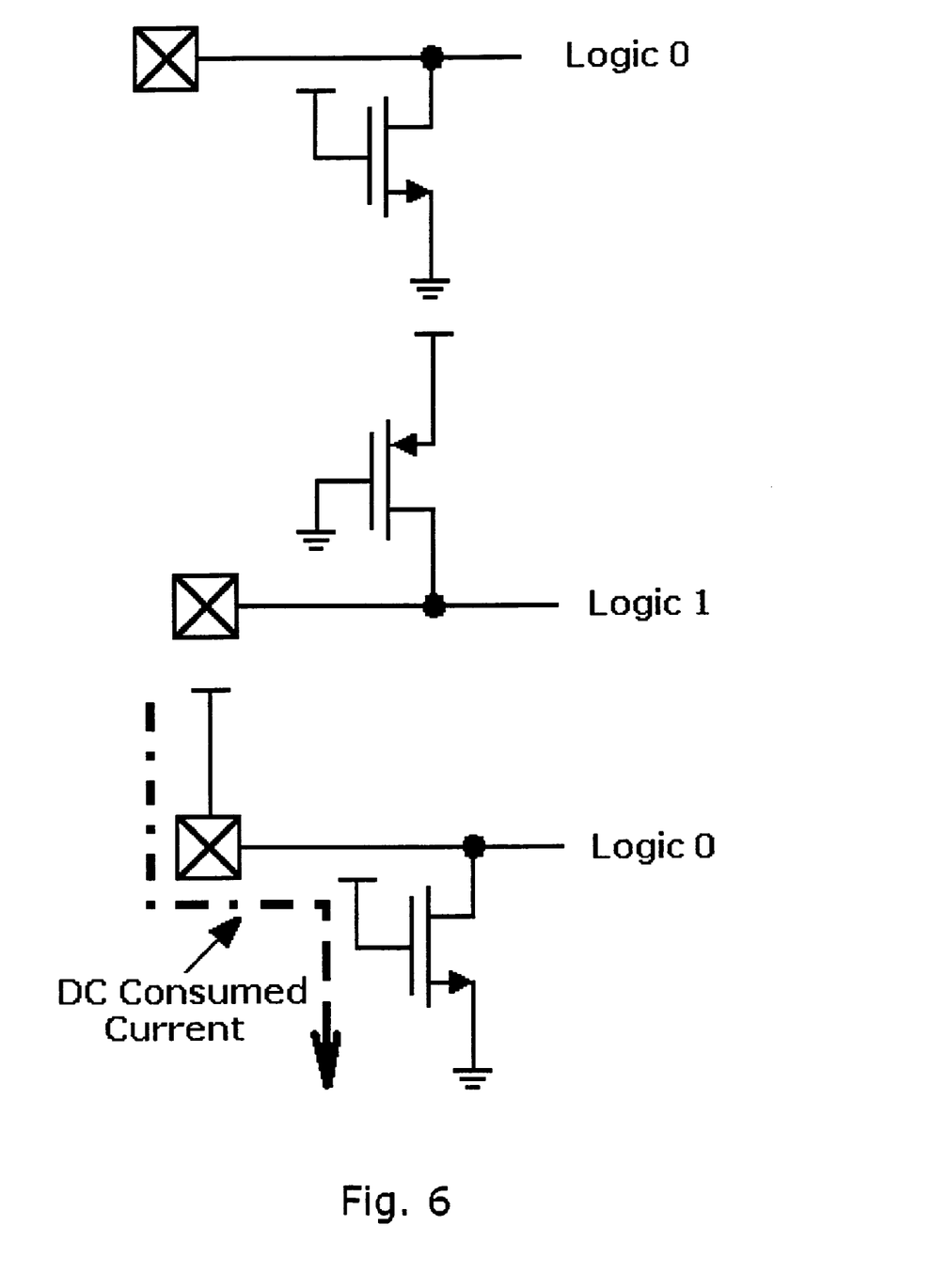
FIG. 6 is a schematic circuit diagram of a general bonding pad.
Figure 7:
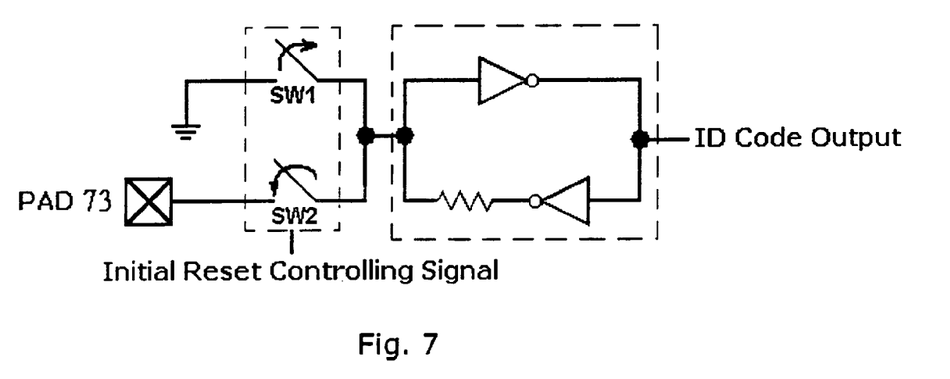
FIG. 7 is a schematic circuit diagram of the bonding pad used in the present invention.

With respect to the bonding pad 54, the ID code adopts a pad bonding technology. In the conventional technology, the bonding pad is fabricated with a pull-up or pull-down method, which separately designates "0" or "1" in logics, as shown in FIG. 6; however, too much direct current is consumed in this case. The circuit of the bonding pad 54 used in the present invention is shown in FIG. 7; it is only in the bond wire's changing the ID code and in the state transition of the initial reset/control signal that no more than 100 μA of current is consumed; in other conditions, there is either only minor leakage current or no power consumption at all. Thus, this technology of the present is superior to the conventional pull-up and pull-down technology, wherein once the device begins to operate, direct current will be ever consumed. This portion of the present invention can also be used to enhance the stability of RFID device and increase the reading reach of RFID device.

Figure 8A:
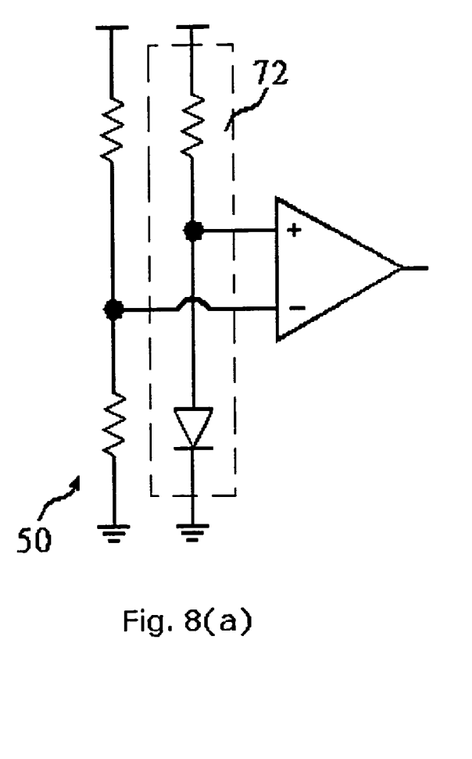
FIG. 8(a) is the diagram of the over-voltage protection circuit used in the present invention.
Figure 8B:
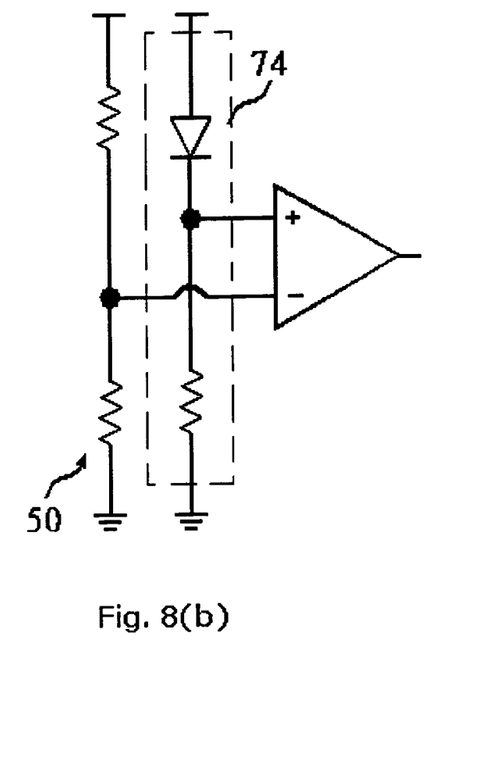
FIG. 8(b) is the diagram of the preferred embodiment of the over-voltage protection circuit used in the present invention.
Figure 9A:
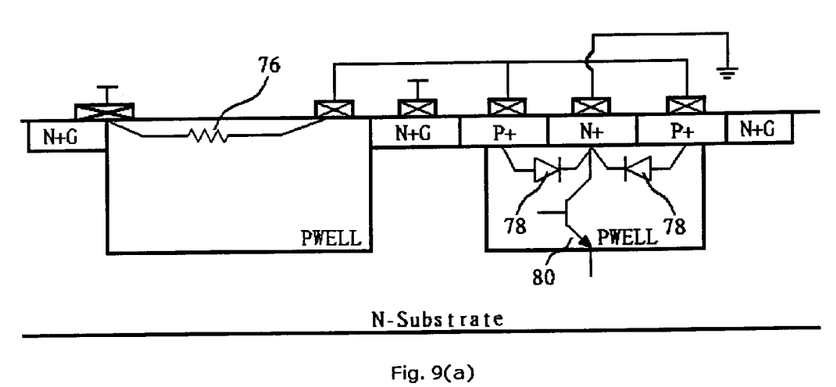
FIG. 9(a) shows a sectional view of the resistance and the diode of the circuit in FIG. 8(a) implemented with a metal-gate process.
Figure 9B:
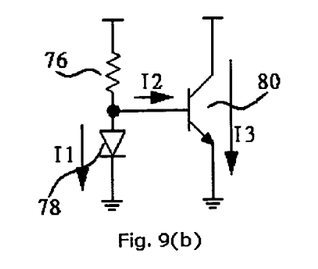
FIG. 9(b) shows the diagram of an equivalent circuit of the resistance and the diode in FIG. 9(a).
Figure 10A:
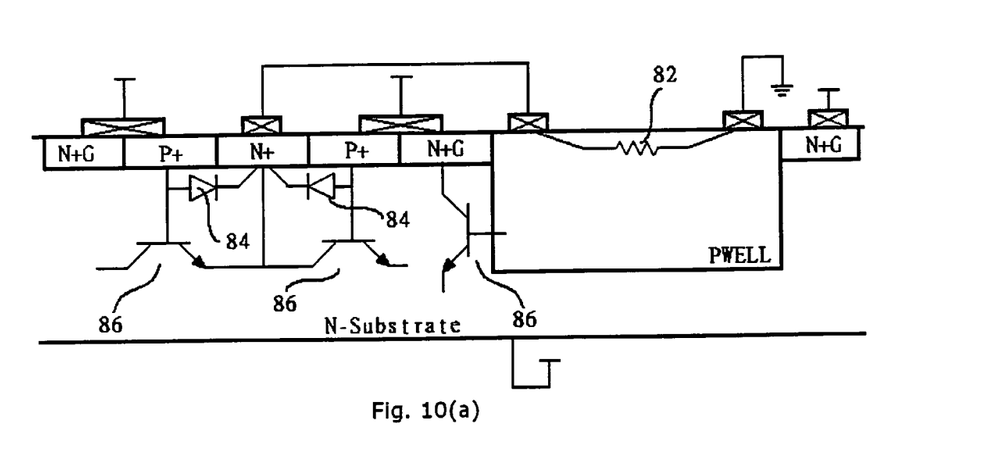
FIG. 10(a) shows a sectional view of the resistance and the diode of the circuit in FIG. 8(b) implemented with a metal-gate process.
Figure 10B:
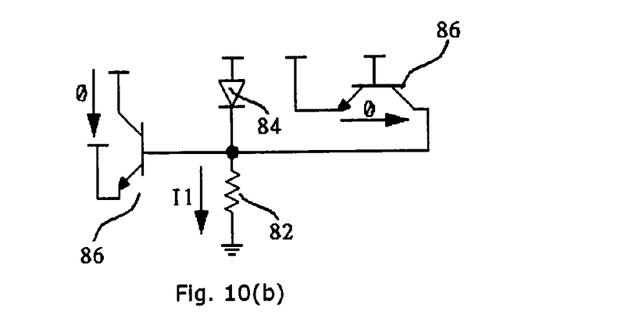
FIG. 10(b) shows the diagram of an equivalent circuit of the resistance and the diode in FIG. 10(a).

With respect to the over-voltage protection circuit 50 and the low-voltage reset circuit 51, the conventional technology shown in FIG. 8(a) can be adopted, and the circuit shown in FIG. 8(b) can also be adopted. Both the circuits are equivalent in function; however, from the section view of the chip implemented with the metal-gate process, the connection method of the circuit shown in FIG. 8(a) will probably incur a tremendous leakage current, which will result in the malfunction of the device. Referring to FIG. 9(a), the resistance and the diode 72 shown in FIG. 8(a) are implemented by the resistance 76 and the diode 78 fabricated with the metal-gate process; however, from the view of a vertical parasitic circuit, there is a parasitic bipolar NPN transistor 80 existing, whose equivalent circuit is shown in FIG. 9(b). When a portion of current flows through the bipolar NPN transistor 80, it acts as a current-consumption path and consumes a tremendous current, which can almost short-circuit the operational power and is apt to incur the malfunction of the device. Therefore, the present invention prefers to adopt the circuit connection shown in FIG. 8(b). Also refer to FIG. 10(a) the section view showing that the resistance and the diode 74 shown in FIG. 8(b) are implemented by the resistance 82 and the diode 84 fabricated with the metal-gate process, wherein there is a parasitic bipolar NPN transistor 86 existing, and the P-type doped end of the resistance and the diode 74 is connected to the positive voltage of the device, which enables the parasitic bipolar diode not to conduct. As there is no triggering-mechanism inducing direct current consumption in this embodiment, it is much superior to the circuit in FIG. 8(a).

In summary, via implementing RFID device with the metal-gate semiconductor process, the present invention can really reduce the fabrication cost and time of RFID device obviously and overcome the problems existing in the conventional technology, and can enable RFID device to be universally applied in daily living.

Figure 2:
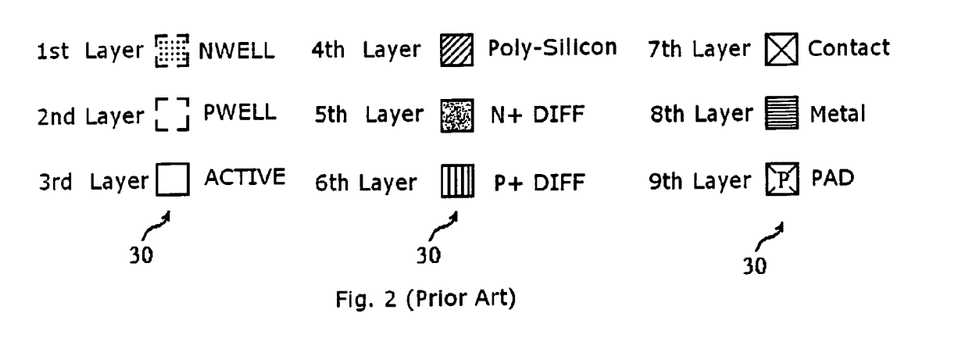
FIG. 2 is a schematic diagram of the photomasks needed in the fabrication of the P-type and N-type MOS transistor used in a conventional RFID tag.
Figure 11:
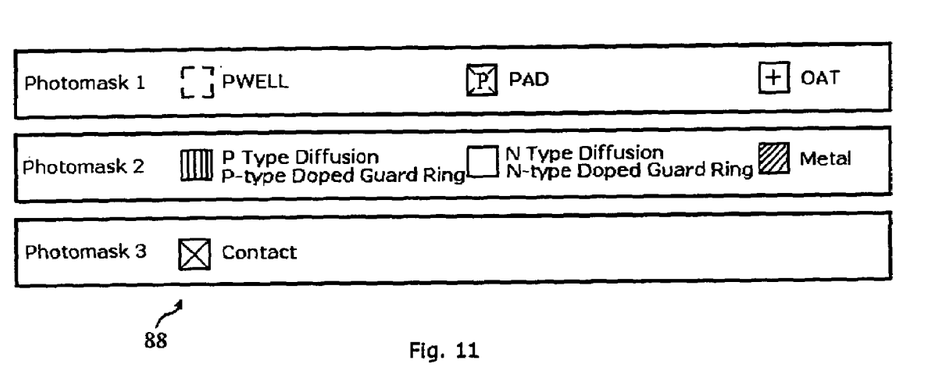
FIG. 11 is a schematic diagram of the photomasks needed in the fabrication of the P-type and N-type MOS transistor used in the present invention.

Besides, in comparison with the quantity of the photomasks used in the conventional technology shown in FIG. 2, the PMOS and NMOS transistors used in the present invention need only three cycles of photomask procedures, as shown in FIG. 11. The reason why the present invention adopts the metal-gate process is to be further clarified below. Referring to Tab. 1 shown below, which compares the metal-gate process with the poly-silicon process, it can be concluded that the present invention can really reduce the fabrication cost and time of RFID device and can indeed be utilized to fabricate a RFID device reading data accurately in short working time and very low cost.

TABLE 1

|  | Polysilicon process | Metal-gate process |
| --- | --- | --- |
| Fabrication time | long | short |
| Fabrication cost | high, about several times to ten times that of the metal-gate process | very low |
| Operational Clock | very high | less than 10 MHz |
| Precision requirement | high | low |

Those embodiments described above are not to limit the scope of the present invention but only to enable the persons skilled in the art to understand, make, and use the present invention. Any equivalent modification and variation according to the spirit of the present invention disclosed herein is to be included within the scope of the present invention.

What is claimed is:

1. A radio frequency identification device implemented with a metal-gate semiconductor fabrication process, comprising:
   a resonance circuit, stabilizing frequencies and selecting radio frequencies;
   a charge capacitor, formed by parasitic junction capacitors created by N-type doped and P-type doped guard rings formed in the metal-gate process;
   a rectification circuit, coupled to said resonance circuit and parallel-connected with said charge capacitor, and cooperating with said resonance circuit and said charge capacitor to provide an operational power for entire said device;
   at least one identification code holder circuit, separately coupled to bonding pads, wherein each said bonding pad stores an identification code and said identification code holder circuit utilizes an initial state to control said bonding pad;
   a non-synchronous local oscillation circuit, generating a local oscillation signal; and a digital control/logic circuit, utilizing said local oscillation signal to control a modulator according to said identification codes inside said bonding pads in order to generate a radio frequency identification signal.

2. The radio frequency identification device implemented with a metal-gate semiconductor fabrication process according to claim 1, further comprising: an over-voltage protection circuit and an low-voltage reset circuit, separately connected with said charge capacitor, wherein said over-voltage protection circuit is to avoid too high a voltage of said operational power, and said low-voltage reset circuit is to detect too low a voltage of said operational power and generate a reset signal in order to avoid a malfunction resulting from too low an induced voltage.

3. The radio frequency identification device implemented with a metal-gate semiconductor fabrication process according to claim 2, wherein said over-voltage protection circuit or said reset circuit is formed via coupling a set of resistances and a diode to a set of amplifiers, and the P-type doped end of said diode is connected to the positive voltage of the device, which enables the parasitic bipolar diode thereof not to conduct.

4. The radio frequency identification device implemented with a metal-gate semiconductor fabrication process according to claim 1, wherein said resonance circuit is formed of an antenna and an internal capacitor.

5. The radio frequency identification device implemented with a metal-gate semiconductor fabrication process according to claim 1, wherein cooperating with said non-synchronous local oscillation circuit, a program code is further installed inside a radio-frequency identification reader in order to correctly read data.

* * * * *